Dec. 18, 1923.
S. J. VAN KUREN
ICE CREAM FREEZER
Filed July 25, 1921
1,478,073
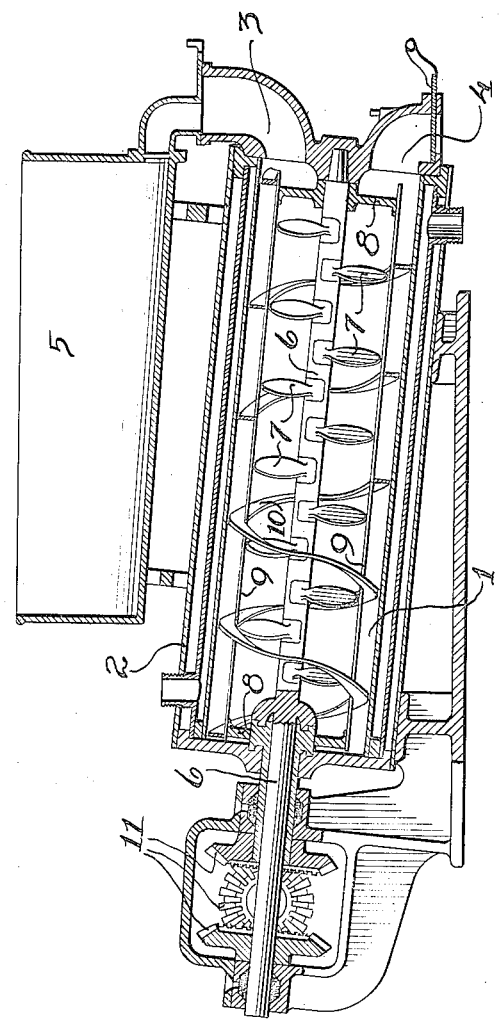

Patented Dec. 18, 1923.

1,478,073

UNITED STATES PATENT OFFICE.

STEPHEN J. VAN KUREN, OF CEDAR RAPIDS, IOWA, ASSIGNOR TO J. G. CHERRY COMPANY, OF CEDAR RAPIDS, IOWA, A CORPORATION OF IOWA.

ICE-CREAM FREEZER.

Application filed July 25, 1921. Serial No. 487,364.

*To all whom it may concern:*

Be it known that I, STEPHEN J. VAN KUREN, a citizen of the United States, residing at Cedar Rapids, in the county of Linn and State of Iowa, have invented certain new and useful Improvements in Ice-Cream Freezers, of which the following is a specification.

My invention relates to that type of ice cream freezer in which the freezing of the cream mixture takes place in a cylinder equipped with agitating devices and while the improvements are shown in a "batch" freezer they may be readily applied to "continuous" freezers.

One object of the invention is to provide means to produce thorough and uniform agitation of the mixture and prevent the formation of a film of frozen cream on the walls of the cylinder of sufficient thickness to result in noticeable insulation.

Another object is to provide agitation devices that will incorporate sufficient air in the frozen cream to give the desired overrun.

Another object is to provide agitating devices to accomplish these desirable results, and including a scraper which, though not actually contacting with the cylinder walls, travels so closely thereto as to prevent the accumulation of a film of frozen cream of any material thickness on the walls of the cylinder. In the accompanying drawing which illustrates a selected embodiment of my invention I show a freezer having an inclined, cylindrical freezing chamber 1 surrounded by a brine jacket 2 and equipped with a supply inlet 3 and a discharge vent 4. But, of course, the invention is equally applicable to freezers in which the freezing chamber is level. A reservoir 5 is mounted on the freezer and leads to inlet 3.

An operating shaft 6 is positioned axially of chamber 1 and rigidly mounts a number of beater paddles 7 which extend radially from shaft 6 and are similarly inclined transversely of the chamber to agitate the contents of the chamber and to propel same in one direction. Spiders 8 are rotatably mounted on shaft 6 and carry a plurality of bars 9 positioned longitudinally of the chamber, a short distance from the wall thereof and beyond the ends of elements 7.

A strip 10 of relatively thin material is formed into a helix which has an outside diameter slightly less than the inside diameter of chamber 1 and an inside diameter equal to the distance between diametrically opposite rods 9. The lead of helical strip 10 is comparatively small and the slight inclination of each portion of the strip to a plane extending transversely of the chamber at that portion enables the strip to function effectively in scraping and advancing any material adjacent the wall of the mixing chamber. Of course, I do not wish to be limited to a flat strip or the helix shown as many shapes formed in a variety of ways may be used.

Outside of the mixing chamber, the freezer is provided with gearing 11 adapted to rotate shaft 6 in one direction and the hub of the adjacent spider 8 with bars 9 and helix 10 in the opposite direction. This is old construction and forms no part of my present invention except as it enables the helical scraper and beater elements to function.

The area and location of the helical scraper and beater elements are such that substantially every particle of the contents of the chamber is continually in motion, relative to the chamber and to the remainder of the contents. As there are no dead or motionless areas, the cream is thoroughly stirred and whipped into a mass of uniform texture with an even distribution of air which makes a light, fluffy product containing no ice or crystallized sugar.

I am aware that helix 10 may be rotatably mounted on shaft 6 by various means and that its exact form, extent and position may be changed without departing from the spirit of my invention. Although I regard the particular form shown as entirely satisfactory for accomplishing the desired results, I reserve the right to make all such changes in my invention and in the embodiment and application as fairly fall within the scope of the following claims.

I claim:

1. In an ice-cream freezer, a mixing chamber, a helical scraper and beater rotatably mounted in said chamber and extending substantially from end to end in close proximity to the inner wall of said chamber, and a plurality of oppositely directed beater elements within said helical scraper and beater.

2. In an ice-cream freezer, a cylindrical mixing and freezing chamber, a rotatable shaft disposed axially within said chamber, a helical scraper and conveyor rotatable about the axis of the chamber and extending substantially from end to end thereof in scraping relation with the inner wall of the chamber, beater paddles carried by the shaft and inclined transversely of the chamber and located at the inner side of the active zone of the helical scraper and conveyor, and means for rotating the shaft in one direction and the scraper and conveyor in the opposite direction.

3. In an ice cream freezer, a cylindrical mixing chamber, a shaft positioned axially thereof, bars parallel with said shaft, spaced therefrom and rotatably mounted thereon, a flat blade forming a helix mounted on said bars and beater paddles mounted radially on said shaft.

4. In an ice cream freezer, a cylindrical mixing chamber, a shaft positioned axially thereof, bars parallel with said shaft and spaced therefrom and from the interior wall of said chamber and rotatably mounted on said shaft, and a ribbon-like helix with one edge mounted on said bars and the opposite edge spaced slightly from the inner wall of said chamber.

5. In an ice cream freezer, a cylindrical mixing chamber, a shaft positioned axially thereof, bars parallel with said shaft, spaced therefrom and from the interior wall of said chamber and rotatably mounted on said shaft, a ribbon-like helix with one edge mounted on said bars and the opposite edge spaced slightly from the inner wall of said chamber, and beater elements radially mounted on said shaft and rotatable therewith.

6. In an ice cream freezer, a cylindrical mixing chamber, a shaft positioned axially thereof, bars parallel with said shaft, a ribbon-like helix mounted on said bars and adapted, when rotated therewith, to scrape the inside of said chamber and to feed the contents of said chamber in one direction, and beater fingers radially mounted on said shaft and adapted to feed the contents of said chamber in the opposite direction.

7. An ice cream freezer comprising a cylindrical freezing chamber, a surrounding brine jacket, a rotatable beater and conveyer device disposed longitudinally of the freezing chamber, there being an annular space between the beater and the inner wall of the freezing chamber, and a rotatable helical scraper located in the said annular space and in scraping relation to said wall of the freezing chamber.

8. An ice cream freezer comprising a cylindrical freezing chamber, a surrounding brine jacket, a rotatable shaft extending longitudinally through the freezing chamber, beater paddles carried by the shaft, a rotatable scraper of helical form embracing and disposed concentrically with respect to the shaft and its beaters and disposed in scraping relation to the cylindrical wall of the freezing chamber, and means for rotating the beaters and helical scraper in opposite directions.

9. An ice cream freezer comprising a cylindrical freezing chamber, a surrounding brine jacket, a rotatable shaft extending longitudinally of the freezing chamber and carrying substantially radial beaters and conveyor devices, there being an annular space between the cylindrical wall of the freezing chamber and the beater and conveyer devices, spiders rotatable upon the shaft, bars carried by the spiders and located in the said annular space, and a helical scraper mounted upon the bars and working in said annular space in scraping relation to the cylindrical wall of the freezing chamber.

STEPHEN J. VAN KUREN.